US005787838A

United States Patent [19]
Abrams

[11] Patent Number: 5,787,838
[45] Date of Patent: Aug. 4, 1998

[54] EGG DECORATING BAG

[75] Inventor: Gary M. Abrams, Brooklyn, N.Y.

[73] Assignee: Easter Unlimited Incorporated, Carle Place, N.Y.

[21] Appl. No.: 625,385

[22] Filed: Apr. 1, 1996

[51] Int. Cl.$^6$ ........ A23G 3/00

[52] U.S. Cl. ........ 118/13; 118/500; 383/116; 426/250

[58] Field of Search ........ 118/13, 46, 500; 206/524.3, 575; 383/116; 426/250

[56] References Cited

U.S. PATENT DOCUMENTS

| | | | |
|---|---|---|---|
| 2,250,980 | 7/1941 | Workman et al. | 383/116 |
| 3,497,129 | 2/1970 | Stein | 383/116 |
| 4,181,745 | 1/1980 | Growe et al. | 426/250 |
| 4,853,240 | 8/1989 | McShane | 426/250 |
| 4,967,687 | 11/1990 | McShane | 118/13 |
| 5,009,940 | 4/1991 | McShane | 428/35.7 |
| 5,565,229 | 10/1996 | Mandle | 426/250 |

*Primary Examiner*—Laura Edwards
*Attorney, Agent, or Firm*—Stroock & Stroock & Lavan LLP

[57] ABSTRACT

A device and method for decorating an egg is provided which comprises a paper bag, the inner surface of which is coated with a water-soluble transfer dye, such that when an egg with a wetted surface is introduced into the bag and comes into contact with the dye on the inner surface of the bag, the dye releases from the bag and transfers onto the egg, coloring the egg.

15 Claims, 2 Drawing Sheets

EGG DECORATING BAG

BACKGROUND OF THE INVENTION

The present invention relates to a device for coloring eggs, and a method of coloring eggs using said device. Specifically, the egg coloring device of the invention comprises a paper bag having an inner surface coated with a water-soluble dye, such that when an egg with wetted surface is introduced into the bag and comes into contact with the dye, the dye releases from the bag and transfers onto the egg, coloring the egg.

Coloring of eggs for decorative purposes is an activity often enjoyed during Christmas and Easter holidays, and several examples of egg decorating arrangements and methods are known in the art.

One such arrangement involves making of a dye solution in a container, and dipping an egg into the solution until the egg is colored. Examples of this type of arrangement is provided in U.S. Pat. Nos. 4,853,240 and 4,967,687. Both of these patents provide an inflexible container having within it a dehydrated dye composition, which can be dissolved in water or diluted acidic acid to produce dye solution. Eggs are then introduced into the dye solution for coloring.

Another method of egg coloring is described in U.S. Pat. No. 4,181,745, and involves use of granular dying medium. This dying medium can be sprinkled directly onto a wetted egg surface, or put into a plastic bag into which a wetted egg can then be inserted and agitated to allow the dye to transfer onto the egg surface.

The above described methods for egg decorating, even though useful, have limitations in that the dye solution and granules can be spilled, creating a mess. Accordingly, a simple, self-contained system for egg coloring which could be used without creating much mess by children is desirable.

SUMMARY OF THE INVENTION

Generally speaking, in accordance with the invention, a bag for decorating eggs is provided. The egg decorating bag of the invention comprises a paper bag, the inner surface of which is coated with a water-soluble dye. When an egg with a wetted surface is introduced into the egg decorating bag and comes into contact with the dye on the inner surface of the bag, the dye releases from the bag and transfers onto the egg, coloring the egg. In a preferred embodiment of the invention, the inner surface of the bag is printed with a food-grade transfer ink, and a key component of which is a water-soluble food dye. The method of coloring eggs using the egg decorating bag of the invention is also provided.

Accordingly, it is an object of the invention to provide an egg decorating device that overcomes prior art drawbacks. Particularly, it is an object of the invention to provide a device for decorating eggs that is convenient and simple to use.

It is also an object of the invention to provide a device for decorating eggs that is self-contained and that can be used without creating a mess.

Still other objectives and advantages of the invention will in part be obvious and will in part be apparent from the specification and drawings. Accordingly, the invention comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

An improved egg coloring bag for decorating eggs is provided in accordance with a preferred embodiment of the invention. Examples of an egg coloring bag constructed in accordance with a preferred embodiment of the invention will be described with reference to FIGS. 1–4. This example is provided for purposes of illustration only and are not intended to be construed in a limiting sense.

Figure 1:
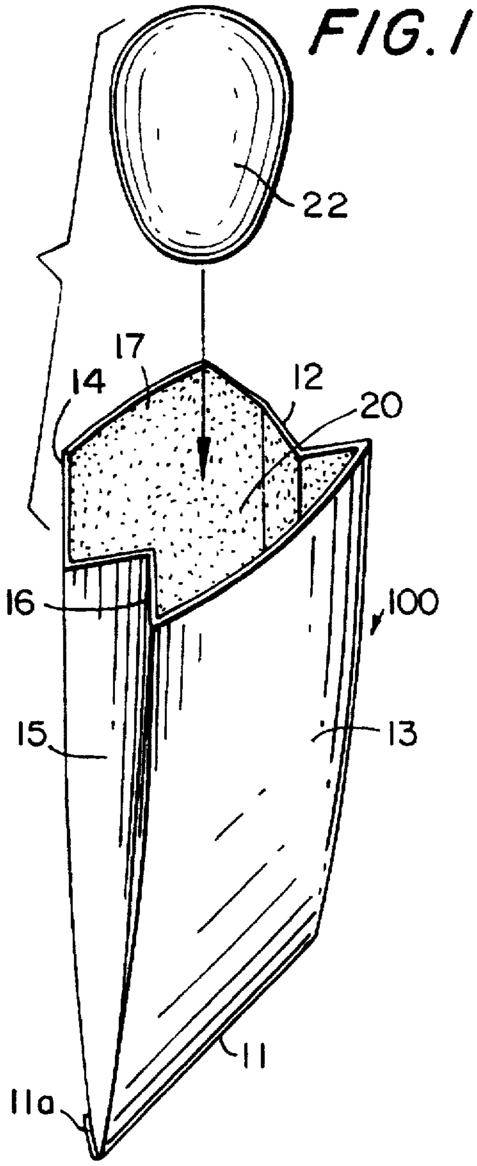
FIG. 1 is the front perspective view of an egg decorating bag constructed in accordance with an embodiment of the invention. A wetted egg, before it is introduced into the egg decorating bag, is also shown.

An egg coloring bag 100, constructed in accordance with a preferred embodiment of the invention, is generally shown in FIG. 1. Through the application, similar elements will be identified by the same reference numbers.

FIG. 1 generally shows an egg coloring bag 100, having a sealed end 11 and an open end 12. Sealed end 11 can be constructed by gathering the bottom portion of a front surface 13 and a back surface 14 of bag 100, and sealing them together. To add strength, the sealed bottom can be folded to define a flap **11*a* sealed to an outer side of the back surface 14 of egg coloring bag 100. Bag 100 also includes a pair of opposing side surfaces 15, which connect front surface 13 with back surface 14. Back surface 14 includes a lip 17, which extends above front surface 13 at open end 12 and can be folded over front surface 13 to close open end 12. Each side surface 15 contains a longitudinal pleat 16, such that by folding side surface 15 along pleat 16, bag 100 can be folded and flattened, while permitting expansion to accommodate a wetted egg. The bag is preferably dimensioned to receive a single egg while permitting its movement in the bag. It should be noted that the present description pertains only to a preferable embodiment of the invention, and that a bag useful for this invention can be of any dimension and shape, as long as it is of sufficient size to comfortably accommodate at least one egg and allow sufficient room for maneuvering the egg, whether by shaking, patting or rubbing, to allow transference of dye from the interior of the bag to the egg. Bag 100 is made of paper. It is preferred that the paper used for bag 100 is of sufficiently light weight and flexibility to allow one to rub or pat the egg located inside bag 100** from outside to increase the contact between the bag's inner surface and the egg. Especially preferred is 25# MF or MG paper, a commonly available light-weight paper.

Figure 5:
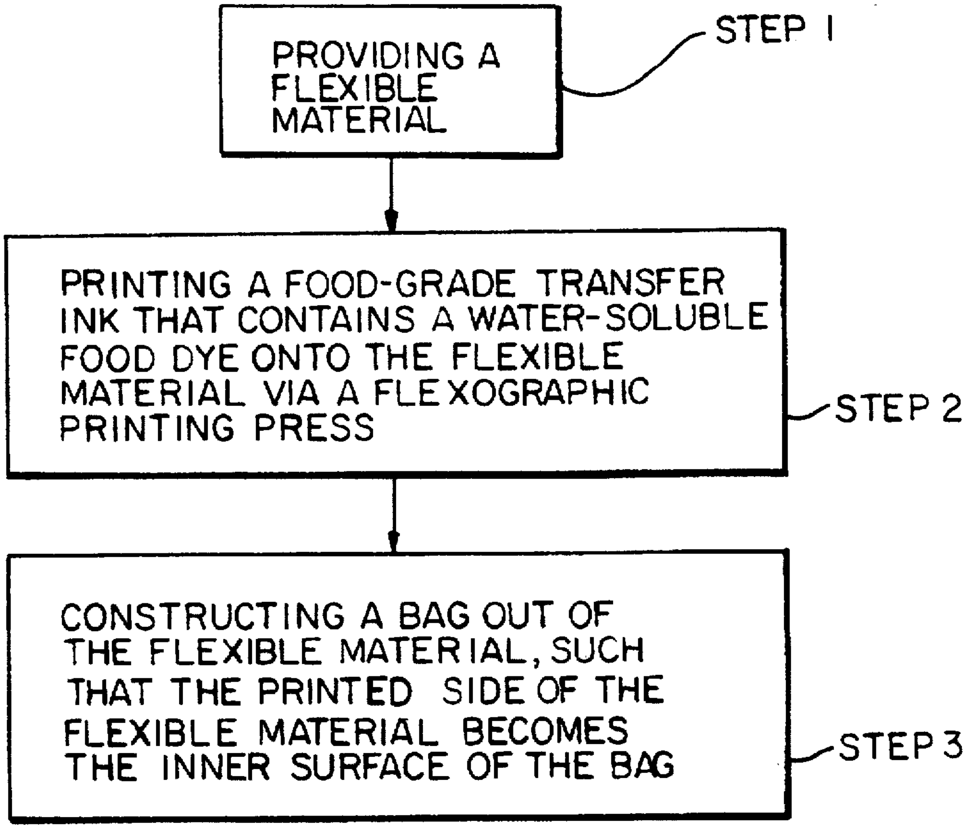
FIG. 5 is a flow chart depicting a method of making of a bag for decorating an egg constructed in accordance with the invention.

The inner surface of bag 100 is coated with a food-grade, transfer ink 20, which can obtained from ink supply sources. Ink 20 can be obtained in a variety of colors, including pink, purple, blue, green and yellow. In a preferred embodiment of the invention, ink 20 is printed onto a sheet of paper on the surface which is to become the inner surface of bag 100 when the bag is formed. Ink 20 can be printed onto the paper using methods available in the art, one such method being use of flexographic press. The printing is done before the paper is cut, folded, and glued into bag 100. As it would be obvious to one skilled in the art, a conventional bagmaking machine can be used to convert the paper into bag 100. Therefore, as is shown in FIG. 5, in step 1 a flexible material is provided. In step 2 a food grade transfer ink that contains a water-soluble food dye is printed onto the flexible material via a flexographic printing press. Finally, in step 3, a bag is constructed out of the flexible material, such that the printed side of the flexible material becomes the inner surface of the bag.

Ink 20 is comprised of the following components: (1) resinous binder which assists ink 20 to stay on the paper once it is printed on the paper, preventing slippage of ink 20 off the paper; and (2) water-soluble food dye. When ink 20 is dry, its dye component sticks to the binder, and the binder sticks to the paper. However, when ink 20 comes in contact with moisture, its dye component comes off the binder. Accordingly, when a wet surface of an egg 22 is placed in contact with ink 20, the dye component of the ink transfers off the paper and onto egg 22. Egg 22 is an egg with its shell intact. It is preferred that egg 22 be a boiled chicken egg.

Figure 2:
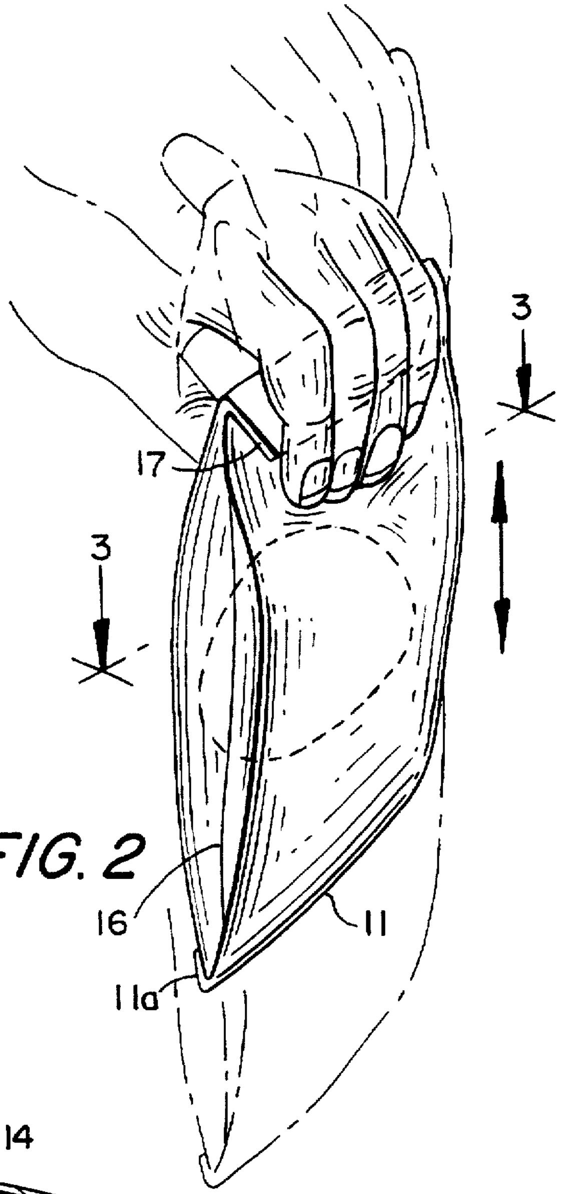
FIG. 2 is the front perspective view of the egg decorating shown in FIG. 1, once the egg is introduced into the bag and showing the bag being shaken to provide agitation.
Figure 3:
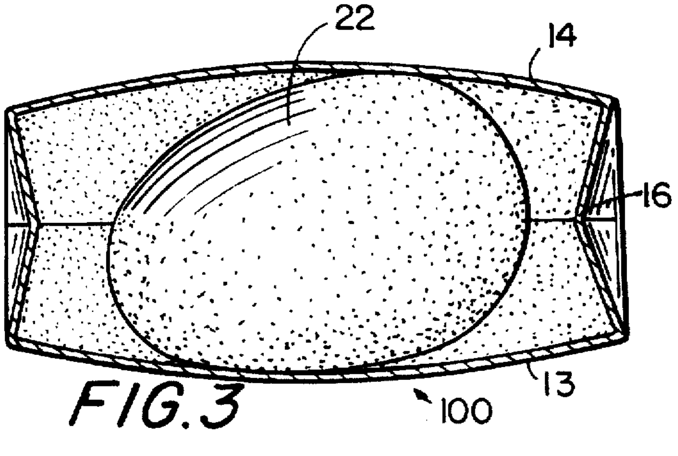
FIG. 3 is a top-cross sectional view of the egg decorating bag in accordance with the invention taken along line 3—3 of FIG. 2.
Figure 4:
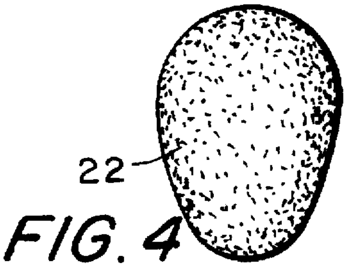
FIG. 4 is a front plane view of an egg that has been colored using the egg decorating bag shown in FIG. 1.

An example of how egg decorating bag 100 can be used is described below. The surface of egg 22, the egg shell, is wetted with water, vinegar-water, or vinegar before it is put into bag 100. Other food grade acidic agents can also be used in place of vinegar. Once egg 22 is put inside bag 100, the wet surface of egg 22 comes into contact with ink 20 located on the inner surface of the bag, attracting the dye component of ink 20. The dye component thus releases from the bag and transfers to the surface of egg 22, coloring the egg. This coloring process can be facilitated by agitating egg 22 within bag 100, e.g., shaking, patting or rubbing, to allow increased contact between the egg and the dye located on the inner surface of the bag. FIG. 2 illustrates shaking of bag 100, one possible method of agitating egg 22 placed within the bag; FIG. 3 depicts the top cross-sectional view of egg 22 being colored within bag 100; and FIG. 4 depicts egg 22 that has been colored. The user can attempt to color the entire surface of the egg or random portions of the surface to create a tie-dyed appearance.

In one embodiment of the invention, the inner surface of bag 100 is printed with one color. In such case, one can dye egg 22 in one color using just one such bag, or dye it with multiple colors by using bags of different colors. It addition, by waxing or otherwise blocking portions of egg 22 before it is wetted and introduced into bag 22, patterns can be created on the egg.

It will thus be seen that the objects set forth above, and those made apparent in the preceding description, are efficiently attained and, since certain changes may be made in the above construction without departing from the spirit and the scope of the invention, it is intended that all matter contained in the above-description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A bag for decorating an egg comprising a bag comprised of a flexible material and dimensioned to receive at least one egg, at least one inner surface of the bag being at least in part coated with a water-soluble dye, such that when an egg with a wetted surface portion is introduced into the bag and comes into contact with the dye on the inner surface of the bag, the dye releases from the bag and transfers onto the wetted surface portion of the egg, coloring that portion of the egg, thereby creating a tie-dyed effect on said egg.

2. The egg decorating bag of claim 1, wherein the water-soluble dye is a component of a transfer ink, at least one inner surface of the bag being at least in part coated with the transfer ink.

3. The egg decorating bag of claim 2, wherein the ink and the dye are food grade.

4. The egg decorating bag of claim 3, wherein the transfer ink coated on the inner surface of the bag is a printable transfer ink.

5. The egg decorating bag of claim 4, wherein the bag is made of one of 25# MF and MG paper.

6. The egg decorating bag of claim 4, wherein the transfer ink coated on the inner surface of the bag is printable using a flexographic press.

7. The egg decorating bag of claim 1, wherein at least a first portion of said inner surface of said bag includes a water-soluble dye of a first color and at least a second portion of inner surface of said bag includes a water-soluble dye of a second color.

8. The egg decorating bag of claim 1, wherein the entire surface of the interior of said bag is coated with said water-soluble dye.

9. The egg decorating bag of claim 2, wherein the entire surface of the interior of said bag is coated with the transfer ink carrying the water-soluble dye.

10. A system for decorating an egg, comprising a plurality of bags, each comprised of a flexible material and dimensioned to receive at least one egg, each of said plurality of bags having an inner surface, at least a portion of each said inner surfaces being at least in part coated with a water-soluble dye, such that when an egg with a wetted surface portion is introduced into any one of said plurality of bags and comes into contact with the dye on the inner surface of the bag, the dye releases from the bag and transfers onto the wetted surface portion of the egg, coloring that portion of the egg, thereby creating a tie-dyed effect on said egg, wherein at least two of said plurality of bags contain a dye of a different color.

11. A method of making a bag for decorating an egg, comprising:

a. providing a flexible material;

b. printing onto the flexible material a food-grade, transfer ink that contains a water-soluble food dye;

c. subsequent to the printing, constructing a bag out of the flexible material, such that the printed side of the flexible material becomes the inner surface of the bag.

12. The method of claim 11, wherein the paper is one of 25# MF and MG paper.

13. The method of claim 11, wherein the printing is accomplished by a flexographic printing process.

14. The egg decorating bag of claim 1, wherein the flexible material is paper.

15. The method of claim 11, wherein the flexible material is paper.

* * * * *